United States Patent
Gao et al.

(10) Patent No.: US 10,935,845 B2
(45) Date of Patent: Mar. 2, 2021

(54) BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zewen Gao, Beijing (CN); Yutao Hao, Beijing (CN); Shubai Zhang, Beijing (CN); Haiwei Sun, Beijing (CN); Ming Zhai, Beijing (CN); Pei Qin, Beijing (CN); Shuo Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/669,953

(22) Filed: Oct. 31, 2019

(65) Prior Publication Data

US 2020/0326593 A1    Oct. 15, 2020

(30) Foreign Application Priority Data

Apr. 11, 2019 (CN) .......................... 201910287280.1

(51) Int. Cl.
*G02F 1/13357* (2006.01)

(52) U.S. Cl.
CPC .. *G02F 1/133606* (2013.01); *G02F 1/133603* (2013.01); *G02F 2001/133607* (2013.01); *G02F 2001/133614* (2013.01); *G02F 2202/36* (2013.01)

(58) Field of Classification Search
CPC ... H05B 33/00; H01L 51/5012; H01L 51/502; H01L 31/035218; G02F 1/133617; G02F 2201/44; G02F 2001/133614; G02F 2001/01791; G02F 2202/36; G02F 1/133602
See application file for complete search history.

(56) References Cited

U.S. PATENT DOCUMENTS 6,072,187 A * 6/2000 Borden .................. G01N 21/53
                                                        250/574
2003/0139484 A1    7/2003 Bentsen et al.
(Continued)

OTHER PUBLICATIONS

U.S. Office Action in U.S. Appl. No. 17/071,380, dated Nov. 19, 2020.

*Primary Examiner* — Michael H Caley
*Assistant Examiner* — Mariam Qureshi
(74) *Attorney, Agent, or Firm* — Collard & Roe, P.C.

(57) ABSTRACT

A backlight module and a display device are disclosed, and the backlight module includes: a light source component, a wavelength selection film, and a first light emitting film laminated in sequence. The light source component is configured to emit light of a first wavelength range, the wavelength selection film transmits the light of the first wavelength range and reflect at least light of a second wavelength range, the second wavelength range does not coincide with the first wavelength range, and the first light emitting film is configured to excite and emit blue light under an illumination of the light of the first wavelength range.

12 Claims, 3 Drawing Sheets

(56) References Cited

U.S. PATENT DOCUMENTS

| | | | |
|---|---|---|---|
| 2008/0199653 A1* | 8/2008 | Kuo | B82Y 20/00 |
| | | | 428/98 |
| 2009/0257114 A1 | 10/2009 | Fujiwara et al. | |
| 2014/0133129 A1* | 5/2014 | Roh | H01J 11/44 |
| | | | 362/84 |
| 2015/0338064 A1* | 11/2015 | Ishino | G02B 6/0023 |
| | | | 349/61 |
| 2017/0146859 A1* | 5/2017 | Lin | G02F 1/133528 |
| 2019/0004374 A1* | 1/2019 | Chang | G02F 1/133617 |
| 2019/0345357 A1* | 11/2019 | Kuniyasu | G02B 5/20 |

* cited by examiner

BACKLIGHT MODULE AND DISPLAY DEVICE

CROSS REFERENCE TO RELATED APPLICATIONS

This application claims the benefit of Chinese Patent Application No. 201910287280.1 filed on Apr. 11, 2019, the entire disclosure of which is incorporated herein by reference in its entirety as part of the present application.

TECHNICAL FIELD

Embodiments of the present disclosure relate to a field of liquid crystal display devices, and more particularly to a backlight module and a display device.

BACKGROUND

A backlight module is a module for providing a backlight for a liquid crystal display device (LCD), and is an important component of the LCD. A portion of light emitted by the backlight module is reflected by a prism film toward a light source component, and then reflected by a white oil on a surface of the light source component, so that the reflected portion of the light is emitted out from the backlight module. However, the reflectance of the white oil to the light is only 80%, so there are problems of light loss and low light efficiency.

SUMMARY

The embodiments of the present disclosure provide a backlight module, including: a light source component, a wavelength selection film, and a first light emitting film laminated in sequence. The light source component is configured to emit at least light of a first wavelength range. The wavelength selection film is configured to transmit the light of the first wavelength range and reflect at least light of a second wavelength range, and the second wavelength range does not coincide with the first wavelength range. The first light emitting film is configured to excite and emit blue light under an illumination of the light of the first wavelength range.

For example, the light source component is an ultraviolet light source component, and the first wavelength range is an ultraviolet wavelength range.

For example, the first wavelength range is a range of 254 to 365 nm.

For example, the first light emitting film is a photonic crystal film including photonic crystal microspheres.

For example, the photonic crystal microspheres are microspheres, respective one of which comprises a core comprising polystyrene and a shell comprising a copolymer of methyl methacrylate and fluorescamine derivative.

For example, the photonic crystal microspheres have a particle size of 170 to 210 nm.

For example, the light source component is a near-infrared light source component, and the first wavelength range is a near-infrared wavelength range.

For example, the first wavelength range is a range of 970 to 980 nm.

For example, the first light emitting film is an up-conversion light emitting film comprising up-conversion light emitting particles and a transparent polymer material.

For example, a material of the up-conversion light emitting particles comprises $NaYF_4$ nanoparticles doped at a mass ratio of Yb:Tm of 20%:0.5%, and the transparent polymer material is polymethyl methacrylate.

For example, the up-conversion light emitting particles have a particle size of 10 to 30 nm.

For example, the wavelength selection film is a laminated film comprising ZnSe nano-films and $SiO_2$ nano-films that are sequentially and repeatedly laminated.

For example, a total number of layers of the ZnSe nano-films and the laminated $SiO_7$ nano-films that are sequentially and repeatedly laminated is 300 to 800.

For example, the backlight module further includes a second light emitting film laminated on a light emitting side of the first light emitting film. The second light emitting film is configured to excite and emit red and green light under an illumination of the blue light, so as to emit white light by mixing the red light and the green light with the blue light.

For example, the second light emitting film is a quantum dot film or a phosphor film.

For example, the backlight module further includes a prism film laminated on a light emitting side of the second light emitting film.

The embodiments of the present disclosure provide a backlight module, including a light source component, a wavelength selection film, a first light emitting film, a second light emitting film, and a prism film laminated in sequence. The light source component is configured to emit at least light of a first wavelength range. The wavelength selection film is configured to transmit the light of the first wavelength range and reflect at least light of a second wavelength range, and the second wavelength range does not coincide with the first wavelength range. The first light emitting film is configured to excite and emit blue light under an illumination of the light of the first wavelength range. The second light emitting film is laminated on a light emitting side of the first light emitting film and is configured to excite and emit red light and green light under an illumination of the blue light, so as to emit white light by mixing the red light and the green light with the blue light.

For example, the light source component includes a mini-LED.

For example, the backlight module further includes a reflection layer disposed on a side of the light source component away from the wavelength selection film.

The embodiments of the present disclosure provide a display device including a backlight module, the backlight module comprises: a light source component, a wavelength selection film, and a first light emitting film laminated in sequence, the light source component is configured to emit at least light of a first wavelength range, the wavelength selection film is configured to transmit the light of the first wavelength range and reflect at least light of a second wavelength range, the second wavelength range does not coincide with the first wavelength range, and the first light emitting film is configured to excite and emit blue light under an illumination of the light of the first wavelength range.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

In order to make objects, technical details and advantages of the embodiments of the invention apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to indicate that the elements or the objects stated before these terms encompass the elements or the objects and equivalents thereof listed after these terms, but do not preclude other elements or objects. The phrases "connect", "connected", etc., are not intended to be limited to a physical connection or mechanical connection, but may include an electrical connection, directly or indirectly. The terms "on," "under," "right," "left" and the like are only used to indicate relative, position relationship, and when the absolute position of the object which is described is changed, the relative position relationship may be changed accordingly.

A micro (Mini) LED refers to a flip LED chip for display with a size between 10 and 200 μm (for example 20 and 80 μm). Compared to a conventional backlight module, the Mini-LED has a smaller light mixing distance, so that the brightness uniformity and the color contrast are unproved; and the Mini-LED can be used with a flexible substrate to achieve a curved surface LCD display similar to an OLED display effect. Due to the maturity of LCD technology, the mini-LED has a cost advantage compared with the OLED. However, the existing mini-LED technology has the following two problems. First, the light efficiency is low. In the conventional mini-LED structure, only 80% of the light is reflected by the white oil of a light panel, so that the light loss is high and the utilization efficiency of light is low. Second, the light mixing distance is too large. The existing mini-LED backlight module is direct type, requiring a certain mixing distance. The mixing distance can be shortened by increasing the arrangement density of the chip, but the cost is increased, causing the problem of large light mixing distance difficult to be solved.

A photonic crystal is formed by spatially periodic arrangement of dielectric materials having different dielectric constants (or refractive index). This periodic structure prevents light of a certain frequency range from propagating therefrom. This frequency range is called a photonic band gap, and the non-propagating light undergoes coherent diffraction on the surface to produce a structural color. Photonic crystals with ultraviolet light response characteristic can emit fluorescence under the excitation of ultraviolet light. Therefore, such photonic crystals not only have a structural color, but also have a fluorescence emitting characteristic. When the photonic band gap is matched with its fluorescence emission spectrum, there is a fluorescence enhancement effect, and the photonic crystal is assembled by nano-scale microspheres, each of which can emit fluorescence, so that a point source of a certain frequency can be converted into a uniform surface source.

Up-conversion nanoluminescence is a non-linear luminescence phenomenon because a short-wavelength light is emitted after two or more long-wavelength photons are continuously absorbed. Inorganic rare earth ions are not capable of realizing up-conversion luminescence alone, and the luminescence is achieved by doping the matrix material. At present, in the up-conversion nanomaterial doped with lanthanide elements, the lanthanide ion is a photosensitive element, and is doped in a suitable host crystal to emit a laser. Therefore, the modulation of the emission wavelength of the up-conversion nanoparticles can be achieved by doping with a suitable lanthanide ion. The up-conversion nano-luminescence has a narrow half-peak width of the emission peak and a long fluorescence lifetime, and has been widely used in applications such as up-conversion lasers, display and biological fluorescent labels.

The main purpose of the present disclosure is to provide a backlight module with a novel structure and a display device, which can solve the problem of light loss in the backlight module and achieve the purpose of improving the light efficiency.

Figure 1:
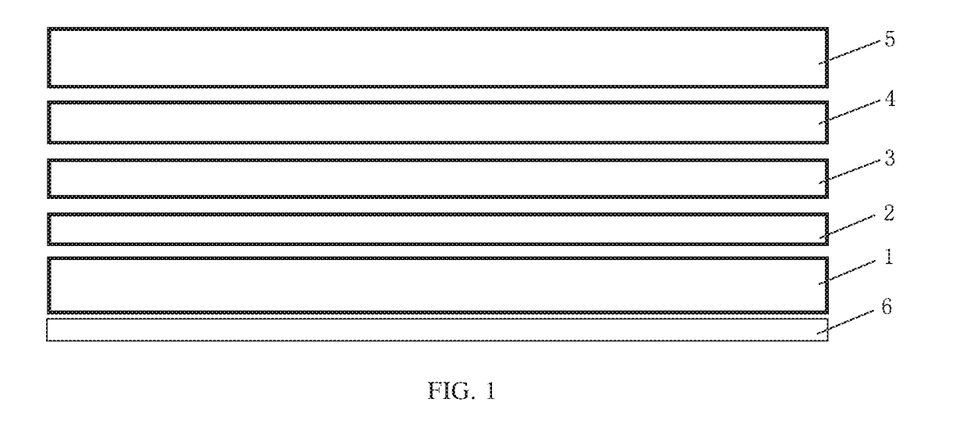
FIG. 1 is a schematic structural view of a backlight module provided by at least one embodiment f the present disclosure.

As shown in FIG. 1, the embodiments of the present disclosure provide a backlight module, including: a light source component 1, a wavelength selection film 2, a first light emitting film 3 a second light emitting film 4 and a prism film 5 laminated in sequence. The light source component is used to emit at least light of a first wavelength range. The wavelength selection film 2 allows the light of the first wavelength range emitted by the first source component 1 to pass through, and reflect light of a blue wavelength band, a red wavelength band and a green wavelength hand. The first light emitting film 3 is capable of exciting and emitting blue light under the illumination of the light of the first wavelength range.

Specifically, the backlight module in the embodiments of the present disclosure, which is an important component of a liquid crystal display device (LCD), is used for supplying a sufficient and uniform light source for the liquid crystal display device, so that the liquid crystal display device can display the image normally.

The light source component 1 is preferably a light panel, and may be a flexible light panel or a rigid light panel, which may be selected depending on the need. In addition, the light of the first wavelength range emitted by the light source component 1 is matched with the first light emitting film 3, that is, the emitted light of the first wavelength range can excite the first light emitting film 3 to make it emit the blue light.

The wavelength selection film 2 is a film for transmitting the light of the first wavelength range emitted from the light source component 1 and reflecting the light of the blue light wavelength band, the red light wavelength band, and the green light wavelength band. The wavelength selection film 2 can regulate the transmission range and the reflection range of the light by regulating the relationship between the difference of the refractive index on the film surface and the wavelength. For example, ZnSe and $SiO_2$ are used as materials, and the wavelength selection film 2 is formed by alternately laminating the ZnSe film and the $SiO_2$ film, and the specific number of layers of the laminating films can be selected according to actual need. At present, three kinds of wavelength selection films have been commercialized, the first one of which transmits the light in the wavelength range of 220-350 nm while reflects the light in the wavelength range of 350-800 nm, the second one of which transmits the light in the wavelength range of 320-480 nm while reflects the light in the wavelength range of 480-800 nm, and the third one of which reflects the light in the wavelength range of 320-480 nm while transmits the light in the wavelength range of 480-800 nm. One of the common wavelength selection films has a reflectance of 98% to the light of 400-800 nm wavelength and a reflectance of 15% to the light of 200-400 nm wavelength.

For example, the first light emitting film 3 is a blue light emitting film capable of emitting the blue light under the excitation of the light of the first wavelength range. That is, the first light emitting film 3 is adapted to the light source component 1. For example, the first light emitting film 3 may be a photonic crystal film or an up-conversion light emitting film.

The second light emitting film 4 is a film capable of emitting the red light and the green light under the excitation of the blue light. For example, the existing red-green light emitting film 4 can be used, which will not be described in detail in the present disclosure. The prism film 5 is a film capable of transmitting light. The parameters such as the prism angle, the prism distribution or the like of the prism film 5 may configured according to specific needs. The prism film 5 may also be a conventional prism film, which will not be described in detail in the present disclosure.

In the backlight module provided by the embodiments of the present disclosure, the wavelength selection film 2 and the first light emitting film 3 are disposed between the light source component 1 and the second light emitting film 4. After the light of the first wavelength range emitted by the light source component 1 passes through the wavelength selection film 2, it is irradiated on the first light emitting film 3, and the first light emitting film 3 is excited to emit light of a blue light wavelength band, i.e., the blue light, which is then irradiated on the second light emitting film 4. The second light emitting film 4 is excited to emit light of a red light wavelength band and a green light wavelength band, i.e., the red light and the green light respectively, and finally the three kinds of light are mixed to emit the white light. Because the wavelength selection film 2 allows only the light of the first wavelength range emitted by the light source component 1 to pass through, the white light reflected by the prism film 5, which includes the light of the blue light wavelength band, the red light wavelength band, and the green light wavelength band, can be totally reflected by the wavelength selection film 2, and then be transmitted through the prism film 5, thereby solving the problem that the backlight module has light loss and low light efficiency. In addition, in the embodiments of the present disclosure, by providing the first light emitting film 3, the light emitted from the light source component 1 is irradiated onto the first light emitting film 3 after passing through the wavelength selection film 2. Because the first light emitting film 3 is an integral film rather than one or more chips that emit light, the first light emitting film 3 excites and emits blue light as a surface light source, which can directly irradiate on the second light emitting film 4, and make the second light emitting film 4 emit the red light and the green light, which are mixed with the blue light to finally generate the white light. Thus, it is not necessary to provide a certain light mixing space between the first light emitting film 3 and the second light emitting film 4, thereby solving the technical problem that the light mixing distance is too large.

As shown in FIG. 1, in the specific implementations, the light source component 1 and the first light emitting film 3 are adapted to each other, for example:

In at least one embodiment of the present disclosure, the light source component 1 is an ultraviolet light source component, and the first light emitting film 3 is a photonic crystal film.

Specifically, the photonic crystal is formed by spatially periodic arrangement of dielectric materials having different dielectric constants (or refractive index). This periodic structure prevents light of a certain frequency range from propagating therefrom. This frequency range is called a photonic band gap, and the non-propagating light undergoes coherent diffraction on the surface to produce a structural color. Photonic crystals with a ultraviolet light response characteristic can emit fluorescence under the excitation of ultraviolet light. Therefore, such photonic crystals not only have a structural color, but also have a fluorescence emitting characteristic. When the photonic band gap is matched with its fluorescence emission spectrum, there is a fluorescence enhancement effect. Therefore, in at least one embodiment of the present disclosure, the photonic crystal film is selected as the first light emitting film 3, and the ultraviolet light source component is matched as the light source component 1, so that the ultraviolet light emitted from the ultraviolet light source component is irradiated on the photonic crystal film to enable the photonic crystal film emit blue fluorescence.

For example, the wavelength of the ultraviolet light emitted by the light source component 1 is in a range of 254-365 nm; and the photonic crystal film is assembled with photonic crystal microspheres having a particle size of 170-210 nm.

Specifically, the ultraviolet light having a wavelength of 254-365 nm is matched with the photonic band gap of the photonic crystal film to enable the photonic crystal film to emit the blue light. The photonic crystal film assembled by the photonic crystal microspheres with a particle size of 170-210 nm has a photonic band gap matched with the fluorescence emission spectrum, which can enhance the fluorescence and further improve the brightness, that is, increase the brightness of the blue fluorescence emitted by the photonic crystal film. The particle size of the photonic crystal microspheres is for example 190 nm. In addition, the photonic crystal film is assembled by nano-scale microspheres, and each microsphere can emit fluorescence. Therefore, when ultraviolet light is irradiated on the photonic crystal film, all photonic crystal microspheres of the photonic crystal film emit blue fluorescence, forming a uniform surface light source, shortening the light mixing distance between the first light emitting film 3 and the second light emitting film 4. The method of assembling a photonic crystal film by using a photonic crystal microsphere may include an inkjet printing process and an industrial lifting assembly process, and thus the photonic crystal produced has a face-centered cubic structure.

For example, the photonic crystal microspheres are microspheres, respective one of which comprises a core comprising polystyrene and a shell comprising a copolymer of methyl methacrylate and fluorescamine derivative.

Specifically, the photonic crystal microspheres provided by the embodiments of the present disclosure may be manufactured by the following method, but is not limited to this manufacturing method:

1 g of styrene and 0.006 g of emulsifier sodium lauryl sulfate are dissolved in 70 mL water, heated with 75 □ water bath under the protection of nitrogen and a mechanical stirring at a speed of 350 r/min; 9 mg of sodium persulfate, 130 mg of ethylene sodium hydrogen sulfate, 9 mg of sodium persulfate are sequentially added, to initiate polymerization with a reaction of 10 min; 19 g of styrene, 0.06 g of sodium lauryl sulfate, 0.06 g of sodium dodecyl diphenyl ether disulfonate, and a mixture of 0.1 g of hydrogen peroxide and 22.5 g of water are slowly added with a reaction time of 2 h; 6.25 mg of sodium persulfate, 25 mg of sodium hydrogen sulfite, 6.25 mg of sodium persulfate are sequentially added with a reaction time of 15 min; 10 g of methyl methacrylate, 0.0125 g of sodium dodecyl sulfate, 0.0525 g of sodium dodecyl diphenyloxide disulfonate, 0.075 g of sodium dodecyl diphenyl ether disulfonate, 0.5 g of fluorescamine derivative, and a mixture of 1 g of acrylic acid and 10 g of water are slowly added with a reaction time of 2.5 h. Then the polymer photonic crystal microspheres with a core-shell structure are obtained.

The added amount of above-mentioned various materials is only the applicable amount in the manufacturing method. When mass production is required, the amount of each of the above materials can be adjusted in an equal proportion, and the parameters such as the reaction time can also be adjusted.

In at least one embodiment of the present disclosure, the light source component 1 is a near-infrared light source component, and the first light emitting film 3 is an up-conversion light emitting film.

Specifically, the up-conversion light emitting film includes up-conversion light emitting particles, and up-conversion light emitting particle luminescence is a non-linear luminescence phenomenon because a short-wavelength light is emitted after two or more long-wavelength photons are continuously absorbed. Inorganic rare earth ions are not capable of realizing up-conversion luminescence alone, and the luminescence is achieved by doping the matrix material. The lanthanide may be doped in the up-conversion light emitting particles, and the lanthanide ion is a photosensitive element, and is doped in a suitable host crystal to emit a laser. Therefore, the modulation of the emission wavelength of the up-conversion light emitting particles can be achieved by doping with a suitable lanthanide ion. In addition, the up-conversion light emitting particle luminescence is characterized by a narrow half-peak width of the emission peak and a long fluorescence lifetime. Thus, under the illumination of the near-infrared light, the up-conversion light emitting film can emit the blue light.

For example, the light source component 1 emits a near-infrared light having a wavelength of 970-980 nm. The up-conversion light emitting film comprises up-conversion light emitting particles having a particle size of 10-30 nm and a transparent polymer material, in which the transparent polymer material can be used as a bonding material for up-conversion light emitting particles. For example, the up-conversion light emitting particles is uniformly distributed throughout the up-conversion light emitting film.

Specifically, for example, the wavelength of the near-infrared light emitted from the light source member 1 is 980 nm, and the up-converted light emitting particles have a particle size of 20 nm. Because the up-conversion light emitting film comprises a mixture of up-conversion light emitting particles having the particle size of 20 nm and a transparent polymer material, and the up-conversion light emitting particles are uniformly distributed, when the near-infrared light is irradiated on the up-conversion light emitting film, all of the up-conversion light emitting particles in the up-conversion light emitting film are excited to form a blue surface light source, which greatly reduces the mixing distance and reduces the cost of the backlight module. Further, by modulating the concentration of the up-conversion light emitting particles in the up-conversion light emitting film, the intensity of the blue surface light source can be regulated. Thus, the concentration of the up-conversion light emitting particles in the up-conversion light emitting film can be adjusted according to actual need, which is not limited by the present disclosure.

For example, the material of the up-conversion light emitting particles comprises NaYF4 nanoparticles doped at a mass ratio of Yb:Tm of 20%:0.5%, and the transparent polymer material is polymethyl methacrylate (PMMA).

Specifically, the up-conversion light emitting particles provided by the embodiments of the present disclosure can be manufactured by the following method, but is not limited to this manufacturing method:

0.24 g of $YCl_3.6H_2O$, 0.078 g of $YbCl_3.6H_2O$, and 0.0019 g of $TmCl_3.6H_2O$ are dissolved in methanol, 6 ml of oleic acid and 15 ml of 1-octadecene are added in a 100 ml three-necked flask, and the mixed methanol solution is added, stirred and heated to 80° C. until the methanol is evaporated. Next, nitrogen gas is supplied to the reaction vessel for protection, and the temperature is further raised to 150+ C. After being heated for 30 minutes, the reaction product is cooled to the room temperature. 0.1482 g of $NH_4F$ and 0.1 g of NaOH are dissolved in methanol and added to the three-neck flask, stirred for 30 min then heated to 80° C. Nitrogen gas is continuously supplied after the completion of the evaporation of the solvent. Then, the temperature is raised to 300° C. at a heating rate of 15° C./min, the air is condensed and maintained for 60 min, and finally cooled to the room temperature. The nitrogen gas is turned off, and a yellow-brown transparent solution is obtained. Then, the obtained solution is poured into ethanol to precipitate, and centrifuged to obtain a white precipitate, which is then dissolved by adding cyclohexane, and then precipitated with methanol and allowed to stand for 30 min. A precipitate is obtained by centrifugation, and ethanol is again added thereto. The mixture is centrifuged to obtain up-conversion light emitting particles. The up-conversion light emitting particles produced by the above method have a rod-like structure and a spherical structure and have a diameter of 20 nm. The up-conversion light emitting particles emit blue light with wavelengths of 450 nm and 475 nm under the excitation of near-infrared light with a wavelength of 980 nm.

In the above-mentioned manufacturing method, the added amount of above-mentioned various materials is only the applicable amount in the manufacturing method. When mass production is required, the amount of each of the above materials can be adjusted in an equal proportion, and the parameters such as the reaction time can also be adjusted.

Specifically, the up-conversion light emitting film provided by the embodiments of the present disclosure may be manufactured by the following method, but is not limited to this manufacturing method:

A surface modification process is performed on the up-conversion light emitting particles for the purpose that the up-conversion light emitting particles can be uniformly mixed with PMMA in a subsequent film forming process. The surface modification process is as follows: dissolve 6 mg of the obtained up-converted light emitting particles in 5 ml of cyclohexane, and add a hydrochloric acid solution (pH=4) thereto, followed by stirring for 1 hour. Further add acetone and then centrifuge to obtain a white precipitate which is then dissolved in 5 ml of deionized water. Then slowly add dropwise 1 ml of ethanol solution containing 60 mg of Si-PEG into the water solution obtained in the last step and stir in the meantime. After a reaction time of 12 h, the modified up-conversion light emitting particles are obtained by centrifugation.

Preparation of the up-conversion light emitting film is as follows: first, mix 20 ml of PMMA and 1 ml of NaYF4:20% Yb, 0.5% Tm in ethanol (concentration range can be 1-6 mg/ml.) to obtain a polymerization precursor, and then add the initiator, 0.25 g of azobisisobutyronitrile, and stir at 60° C. for 2 h to carry out prepolymerization. NaYF4:20% Yb, 0.5% means NaYF4 nanoparticles doped at a mass ratio of Yb:Tm of 20%:0.5%. After that, the temperature is raised to 80° C., and the polymerization is completed after 45 minutes of reaction. The product is allowed to stand for 1 h, the bubbles are discharged, a film is formed by a spin coating process, and the film is subjected to high temperature treatment to remove the remaining monomers, thereby finally obtaining the up-conversion light emitting film. The modulation of NaYF4:20% Yb, 0.5% Tm can achieve the modulation of blue light intensity.

It should be noted that in the above-mentioned manufacturing method for the up-conversion light emitting film by uniformly mixing the up-conversion light emitting particles with PMMA, the amount of above-mentioned various materials is only the applicable amount in the manufacturing method. When mass production is required, the amount of each of the above materials can be adjusted in an equal proportion, and the parameters such as the reaction time can also be adjusted.

Figure 2:
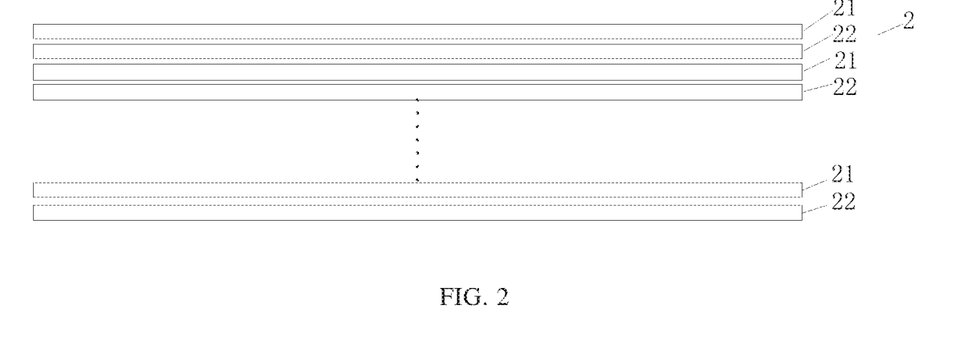
FIG. 2 is a schematic structural view of a wavelength selection film provided by at least one embodiment of the present disclosure.
Figure 3:
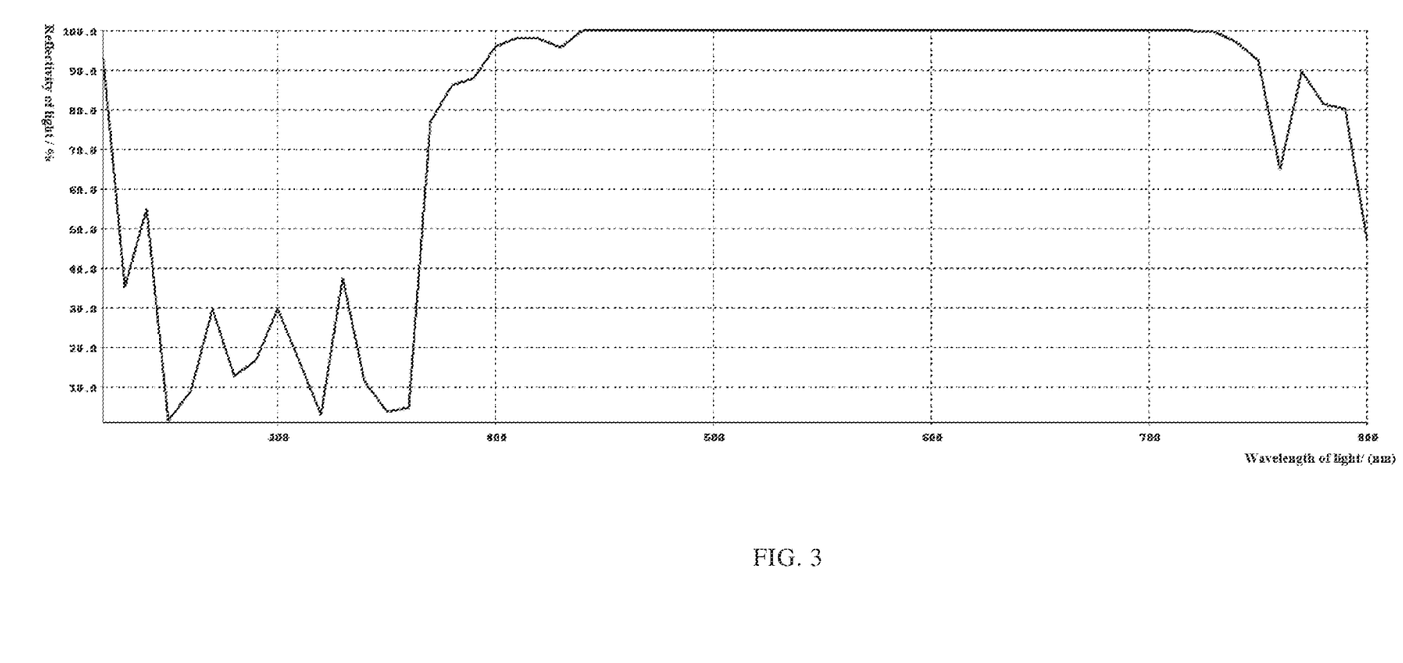
FIG. 3 is a schematic view of the reflectance to the light of a wavelength selection film provided by at least one embodiment of the present disclosure.

As shown in FIG. 2 and FIG. 3, in the specific implementations, the wavelength selection film 2 is a laminated film comprising ZnSe nano-films and SiO₂ nano-films that are sequentially and repeatedly laminated, and the parameters of the film are as shown in Table 1; the total number of layers of the ZnSe nano-films and the laminated SiO₂ nano-films that are sequentially and repeatedly laminated is 300 to 800. In addition, using ZnSe and SiO₂ materials to form the wavelength selection film 2 is only a preferred method, and is not specifically limited. The wavelength selection film 2 may also comprises other materials, as long as they can archive the transmitting of the ultraviolet fight and the near infrared light and the reflecting of the light in the blue, red, and green wavelength bands.

TABLE 1

| Parameters of film | | | | | | | | | |
|---|---|---|---|---|---|---|---|---|---|
| Number of layers | 1 | 2 | ... | 399 | 400 | 401 | 402 | ... 409 | 410 |
| Material | ZnSe | SiO₂ | ... | ZnSe | SiO₂ | ZnSe | SiO₂ | ... ZnSe | SiO₂ |
| Thickness/nm | 57.69 | 101.49 | ... | 57.69 | 101.49 | 43.27 | 76.12 | ... 43.27 | 76.12 |
| Number of layers | 411 | 412 | ... | 809 | 810 | 811 | 812 | ... 1209 | 1210 |
| Material | ZnSe | SiO₂ | ... | ZnSe | SiO₂ | ZnSe | SiO₂ | ... ZnSe | SiO₂ |
| Thickness/nm | 50.48 | 88.8 | ... | 50.48 | 88.8 | 60.58 | 106.56 | ... 60.58 | 106.56 |
| Number of layers | 1211 | 1212 | ... | 1409 | 1410 | 1411 | 1412 | ... 1809 | 1810 |
| Material | ZnSe | SiO₂ | ... | ZnSe | SiO₂ | ZnSe | SiO₂ | ... ZnSe | SiO₂ |
| Thickness/nm | 66.35 | 116.71 | ... | 66.35 | 116.71 | 72.12 | 126.86 | ... 72.12 | 126.86 |

Figure 4:
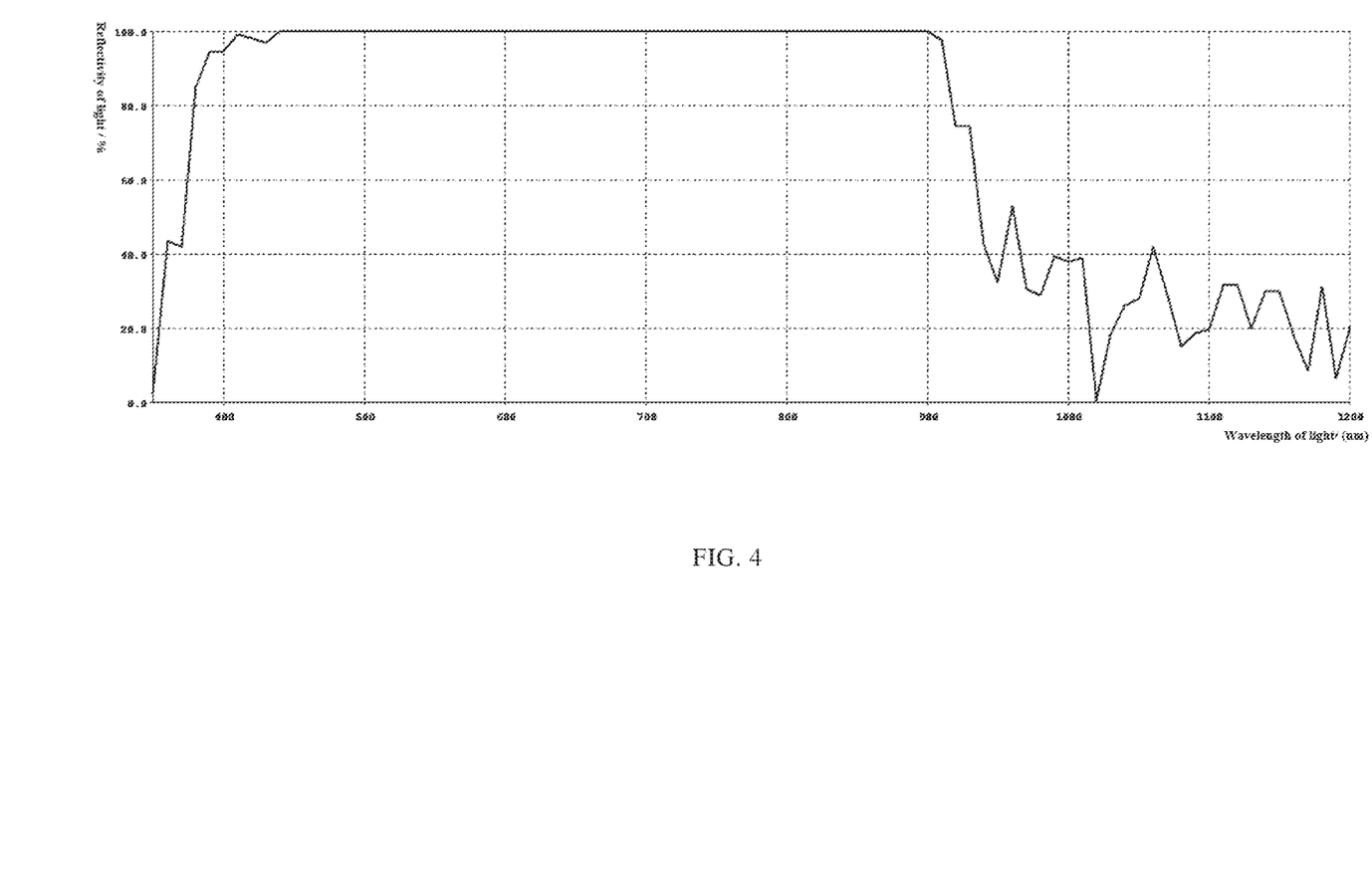
FIG. 4 is a schematic view of the reflectance to the light of another wavelength selection film provided by at least one embodiment of the present disclosure.

Specifically, the multilayer ZnSe nano-films 21 and the multilayer SiO₂ nano-films 22 are sequentially alternately laminated, and the numbers of the ZnSe nano-films 21 and the SiO₂ nano-films 22 are equal, that is, the total number of layer is an even number. The ZnSe nano-film 21 preferably has a thickness of 40-60 nm, the SiO₂ nano-film 22 preferably has a thickness of 80 to 130 nm. The specific properties of the wavelength selection film 2 obtained by the above techniques conditions are shown in FIG. 3 and FIG. 4, in which FIG. 3 is the reflection state of the wavelength selection film 2 to the light with wavelength below 800 nm. It can be seen that the reflectivity of the wavelength selection film 2 to the ultraviolet light with a wavelength of 254-365 nm is less than 30%. That is, the transmission effect is good. And it can be seen that the reflectivity of the wavelength selection film 2 to the red light with a wavelength of 620-760 nm, the green light with a wavelength of 495-570 nm and the blue light with a wavelength of 476-495 nm is 100% or near 100%. That is, the wavelength selection film 2 can be applied to the backlight module in which the light source component 1 is an ultraviolet light source component, and the first light emitting film 3 is a photonic crystal film. Further, FIG. 4 is the reflection state of light the wavelength selection film 2 to light with wavelength between 350 and 1200 nm. It can be seen that the reflectivity of the wavelength selection film 2 to the near-infrared light with a wavelength of 970-980 nm is around 30%. That is, the transmission effect is good. And it can be seen that the reflectivity of the wavelength selection film 2 to the red light with a wavelength of 620-760 nm, the green light with a wavelength of 495-570 nm and the blue light with a wavelength of 476-495 nm is 100% or near 100%. That is, the wavelength selection film 2 can be applied to the backlight module in which the light source component 1 is a near-infrared light source component, and the first light emitting film 3 is an up-conversion light emitting film.

In a specific implementation, the second light emitting film 4 is a quantum dot film or a phosphor film.

Specifically, quantum dots are invisible to the naked eye, with extremely tiny inorganic nanocrystals. Once it is stimulated by light, the quantum dots emit very pure colored light, so the quantum dot film may be used as the second light emitting film 4 under a controllable cost.

In addition, the photonic crystal film may be selected from other phosphors that can emit the blue light under excitation of the ultraviolet light, such as a mixture of a urethane group-containing phthalimide and a fluorescamine, or a derivative of a diphenyl hydrazine and a diphenyl fluorene-based group. The up-conversion light emitting particles in the up-conversion light emitting film may be selected from the up-conversion light emitting particles doped with other lanthanide materials to emit blue light.

For example, the light source component 1 provided by at least one embodiment of the present disclosure may be an LED, a mini LED, and a micro blue chip, etc., which is not limited by at least one embodiment of the present disclosure.

For example, in a backlight module provided by at least one embodiment of the present disclosure, a side of the light source component 1 away from the wavelength selection film 2 may be provided with a reflection layer 6, and the reflection layer 6 may be formed by coating the reflection material or attaching the reflection sheet. It should be noted that providing the reflection layer 6 on the side of the light source component 1 away from the wavelength selection film 2 can reflect the light escaping from the light source component to the wavelength selection film 2, thereby improving light utilization efficiency.

At least one embodiment of the present disclosure display device including a backlight. As shown in FIG. 1, the backlight module includes a light source component 1, a wavelength selection film 2, a first light emitting film 3, a second light emitting film 4 and a prism film 5 laminated in sequence. The light source component 1 is configured to emit at least light of a first wavelength range, the wavelength selection film 2 allows the light of the first wavelength range emitted by the first source component 1 to pass through, and reflect the light of a blue wavelength band, a red wavelength band and a green wavelength band. The first light emitting film 3 is capable of exciting and emitting blue light under the illumination of the light of the first wavelength range. The second light emitting film 4 is laminated on a light emitting side of the first light emitting film 3, and the second light emitting film 4 is configured to excite and emit red light and green light under the illumination of the blue light, so as to emit white light by mixing the red light and the green light with the blue light. The prism film 5 is laminated on a light emitting side of the second light emitting film 4.

Specifically, the backlight module described in this embodiment can use the backlight module provided in the foregoing embodiment. The specific implementation structure can be referred to the related content described in the foregoing embodiment, and details are not described herein again.

As shown in FIG. 1, the display device provided by the embodiments of the present disclosure uses a backlight module in which the wavelength selection film 2 and the first light emitting film 3 are provided between the light source component 1 and the second light emitting film 4. After the light of the first wavelength range emitted by the light source component 1 passes through the wavelength selection film 2, it is irradiated on the first light emitting film 3, and the first light emitting film 3 is excited to emit light of a blue light wavelength band, i.e., the blue light, which is then irradiated on the second light emitting film 4. The second light emitting film 4 is excited to emit light of a red light wavelength band and a green light wavelength band, i.e., the red light and the green light, and finally the three kinds of light are mixed to emit the white light. Because the wavelength selection film 2 allows only the light of the first wavelength range emitted by the light source component 1 to pass through, the white light reflected by the prism film 5, which includes the light of the blue light wavelength band, the red light wavelength band, and the green light wavelength band, can be totally reflected by the wavelength selection film 2, and then be transmitted through the prism film 5, thereby solving the problem that the backlight module has light loss and low light efficiency. In addition, in the embodiments of the present disclosure, by providing the first light emitting film 3, the light emitted from the light source component 1 is irradiated onto the first light emitting film 3 after passing through the wavelength selection film 2. Because the first light emitting film 3 is an integral film rather than one or more chips that emit light, the first light emitting film 3 excites and emits blue light as a surface light source, which can directly irradiate on the second light emitting film 4, and make the second light emitting film 4 emit the red light and the green light, which are mixed with the blue light to finally generate the white light, Thus, it is not necessary to provide a certain light mixing space between the first light emitting film 3 and the second light emitting film 4, thereby solving the technical problem that the light mixing distance is too large.

What are described above is related to the illustrative embodiments of the disclosure only and not limitative to the scope of the disclosure; the scopes of the disclosure are defined by the accompanying claims.

What is claimed is:

1. A backlight module, comprising:
   a light source component, a wavelength selection film, and a first light emitting film laminated in sequence,
   wherein the light source component is configured to emit at least light of a first wavelength range, the wavelength selection film is configured to transmit the light of the first wavelength range and reflect at least light of a second wavelength range, the second wavelength range does not coincide with the first wavelength range, and the first light emitting film is configured to excite and emit blue light under an illumination of the light of the first wavelength range, wherein the light source component is an ultraviolet light source component, and the first wavelength range is an ultraviolet wavelength range, the first light emitting film is a photonic crystal film comprising photonic crystal microspheres, wherein the photonic crystal microspheres are microspheres, respective one of which comprises a core comprising polystyrene and a shell comprising a copolymer of methyl methacrylate and fluorescamine derivative.

2. The backlight module of claim 1, wherein the first wavelength range is a range of 254 to 365 nm.

3. The backlight module of claim 1, wherein the photonic crystal microspheres have a particle size of 170 to 210 nm.

4. The backlight module of claim 1, wherein the wavelength selection film is a laminated film comprising ZnSe nano-films and $SiO_2$ nano-films that are sequentially and repeatedly laminated.

5. The backlight module of claim 4, wherein a total number of layers of the ZnSe nano-films and the laminated $SiO_2$ nano-films that are sequentially and repeatedly laminated is 300 to 800.

6. The backlight module of claim 1, further comprising:
   a second light emitting film laminated on a light emitting side of the first light emitting film, wherein the second light emitting film is configured to excite and emit red light and green light under an illumination of the blue light, so as to emit white light by mixing the red light and the green light with the blue light.

7. The backlight module of claim 6, wherein the second light emitting film is a quantum dot film or a phosphor film.

8. The backlight module of claim 6, further comprising a prism film laminated on a light emitting side of the second light emitting film.

9. A backlight module comprising:
a light source component, a wavelength selection film, a first light emitting film, a second light emitting film, and a prism film laminated in sequence,
wherein the light source component is configured to emit at least light of a first wavelength range, the wavelength selection film is configured to transmit the light of the first wavelength range and reflect at least light of a second wavelength range, the second wavelength range does not coincide with the first wavelength range, the first light emitting film is configured to excite and emit blue light under an illumination of the light of the first wavelength range, the second light emitting film is configured to excite and emit red light and green light under an illumination of the blue light, so as to emit white light by mixing the red light and the green light with the blue light; wherein the light source component is an ultraviolet light source component, and the first wavelength range is an ultraviolet wavelength range, the first light emitting film is a photonic crystal film comprising photonic crystal microspheres, wherein the photonic crystal microspheres are microspheres, respective one of which comprises a core comprising polystyrene and a shell comprising a copolymer of methyl methacrylate and fluorescamine derivative.

10. The backlight module of claim 9, wherein the light source component comprises a mini-LED.

11. The backlight module of claim 9, further comprising a reflection layer disposed on a side of the light source component away from the wavelength selection film.

12. A display device, comprising a backlight module, wherein the backlight module comprises:
a light source component, a wavelength selection film, and a first light emitting film laminated in sequence,
wherein the light source component is configured to emit at least light of a first wavelength range, the wavelength selection film is configured to transmit the light of the first wavelength range and reflect at least light of a second wavelength range, the second wavelength range does not coincide with the first wavelength range, and the first light emitting film is configured to excite and emit blue light under an illumination of the light of the first wavelength range; wherein the light source component is an ultraviolet light source component, and the first wavelength range is an ultraviolet wavelength range, the first light emitting film is a photonic crystal film comprising photonic crystal microspheres, wherein the photonic crystal microspheres are microspheres, respective one of which comprises a core comprising polystyrene and a shell comprising a copolymer of methyl methacrylate and fluorescamine derivative.

* * * * *